United States Patent [19]

Shiraishi et al.

[11] Patent Number: 5,774,607
[45] Date of Patent: Jun. 30, 1998

[54] LENSED-FIBER WITH CASCADED GRADED-INDEX FIBER CHIP CONFIGURATION

[75] Inventors: Kazuo Shiraishi, Saitama; Kazuhito Matsumura, Utsunomiya; Isamu Ohishi, Tokyo, all of Japan

[73] Assignee: The Furukawa Electric Co., Ltd., Tokyo, Japan

[21] Appl. No.: 718,375

[22] PCT Filed: Feb. 22, 1996

[86] PCT No.: PCT/JP96/00398

§ 371 Date: Sep. 27, 1996

§ 102(e) Date: Sep. 27, 1996

[87] PCT Pub. No.: WO96/26459

PCT Pub. Date: Aug. 29, 1996

[30] Foreign Application Priority Data

Feb. 23, 1995 [JP] Japan .................................. 7-035282
Mar. 3, 1995 [JP] Japan .................................. 7-044456

[51] Int. Cl.⁶ .................................................. G02B 6/32
[52] U.S. Cl. .................................. 385/33; 385/34; 385/35
[58] Field of Search ............................................ 385/33–35

[56] References Cited

U.S. PATENT DOCUMENTS

| | | | |
|---|---|---|---|
| 4,078,852 | 3/1978 | Lebduska | 385/33 |
| 4,456,330 | 6/1984 | Blüdaii | 385/33 |
| 5,293,438 | 3/1994 | Konno et al. | 385/33 |
| 5,446,816 | 8/1995 | Shiraishi et al. | 385/83 |

FOREIGN PATENT DOCUMENTS

| | | | |
|---|---|---|---|
| 0155379 A | 9/1985 | European Pat. Off. | 385/33 |
| 58-79210 | 5/1983 | Japan . | |
| 1-92608 | 6/1989 | Japan . | |
| 3-130705 | 6/1991 | Japan . | |
| 4-97109 | 3/1992 | Japan . | |

OTHER PUBLICATIONS

"A Fiber Lens with a Long Working Distance for Integrated Coupling Between Laser Diodes and Single–Mode Fibers", Journal Of Lightwave Technology, vol. 13, No. 8, Aug. 1995, pp. 1736–1744.

Primary Examiner—Phan T. H. Palmer
Attorney, Agent, or Firm—Frishauf, Holtz, Goodman, Langer & Chick

[57] ABSTRACT

A lensed-fiber including a single-mode fiber having a core and a cladding, a coreless fiber having a coreless isotropic refractive index and a convex surface at a first end thereof, and a square-law index fiber having a square-law index profile. The square-law index fiber is positioned between the single-mode fiber and the coreless fiber so as to connect an end of the single-mode fiber to a second end of the coreless fiber. The lensed-fiber may be arranged in a optical module facing an optical semiconductor element which emits a light beam to be propagated through the single-mode fiber.

5 Claims, 6 Drawing Sheets

LENSED-FIBER WITH CASCADED GRADED-INDEX FIBER CHIP CONFIGURATION

TECHNICAL FIELD

The present invention relates to a lensed-fiber.

BACKGROUND ART

Coupling an optical semiconductor device, such as a laser diode, and an optical fiber with a high coupling efficiency is one of the most important techniques in the field of light communication. Conventionally known are methods in which the optical semiconductor device and the optical fiber are coupled by means of a lens, such as a spherical or nonspherical lens, located between them, and in which a laser diode 5 is coupled with a hemispherically-ended fiber 1 having a spherical tip end along with a core 1a, as shown in FIG. 7.

In the method in which the laser diode 5 is coupled with the hemispherically-ended fiber 1, no lens is used, so that a small-scale coupling can be enjoyed. In addition, a laser diode array and a hemispherically-ended fiber array can be coupled with each other.

According to this coupling method, however, the distance between the tip end of the hemispherically-ended fiber 1 and an emission end face 5a of the laser diode 5 in the optical axis direction, that is, a working distance, must be adjusted to approximately 10 $\mu$m, in order to effectuate a high coupling efficiency. In assembling the hemispherically-ended fiber 1 and the laser diode 5 into a coupling system, therefore, they sometimes come into contact or collision with each other to be damaged and disabled.

Accordingly, a lensed-fiber 2 shown in FIG. 8 has been proposed as coupling means which can solve the above problem. This fiber 2 is coreless and has an isotropic refractive index, and includes a coreless fiber 4 having a spherical tip end, which is connected to the tip end of an optical fiber 3. A working distance D is lengthened so that contact or collision with the laser diode 5 can be avoided.

In the lensed-fiber 2 with the aforesaid construction, however, the tip end of the coreless fiber 4 is spherical in shape, so that there is a problem that the efficiency of coupling with the laser diode 5 is lowered due to spherical aberration. More specifically, light beams emitted from the laser diode 5 are projected at various angles on the spherical surface of the tip end of the coreless fiber 4, theoretically converged by the lens effect of the spherical surface, and projected on a junction surface $F_c$ between the optical fiber 3 and the coreless fiber 4.

There is a problem, however, that some light beams may be incident upon a cladding outside a core 3a on the junction surface $F_c$ between the optical fiber 3 and the coreless fiber 4, or fail to propagate through the core 3a because the angle of incidence is greater than the critical angle even though the core 3a is reached, so that the efficiency of coupling between the lensed-fiber 2 and the laser diode 5 is lowered.

SUMMARY OF THE INVENTION

The object of the present invention is to provide a lensed-fiber which ensures improvement of the efficiency of coupling with an optical semiconductor device.

In order to achieve the above object, the inventors hereof first modeled an analysis of structural parameters of the conventional lensed-fiber 2, which define coupling characteristics for a high coupling efficiency, by a-method based on geometrical optics.

For the conventional lensed-fiber 2, as shown in FIG. 8, the relation between the incidence angle $\phi_1$ (degrees) of the light beams on the junction surface $F_c$ between the optical fiber 3 and the coreless fiber 4 and the incidence position $h_1$ ($\mu$m) measured from an optical axis $L_a$ was analyzed in a manner such that the emission angle $\theta$ (degrees) of the light beams from the laser diode 5 as a parameter, was varied by degrees. In this analysis, the lensed-fiber 2 was arranged so that the refractive index of the coreless fiber 4 was 1.45, working distance D was 130, 150, and 170 ($\mu$m), length L of the coreless fiber 4 was 1 (mm), and curvature radius R was 75 ($\mu$m). FIG. 9 shows the results of this analysis.

In FIG. 9, a black spot represents an analytic value for the incidence angle $\phi_1$ and the incidence position $h_1$ based on the light beams on the optical axis $L_a$ at the emission angle $\theta=0°$. As the absolute value $|\theta|$ of the emission angle $\theta$ increases from this point, the analytic value for the incidence angle $\theta_1$ and the incidence position $h_1$ changes in a curve having the shape of a tilted inverted N in the horizontal direction.

In consideration of the core diameter (=8 $\mu$m) of a conventional single-mode fiber, on the other hand, light beams incident upon the core 3a of the optical fiber 3 must be adjusted so that the incidence angle $\phi_1$ and the incidence position $h_1$ are within ranges, $|\phi_1| \leq 4.8°$ and $|h_1| \leq 4.0$ $\mu$m, indicated by an oblong in the drawing.

Thus, although the range of the incidence angle $\phi_1$ of the lensed-fiber 2 has allowance, the allowable range for the incidence position $h_1$ is narrow on account of the small radius of the core 3a of the optical fiber 3. This feature was found to be the reason why many of the light beams emitted from the laser diode 5 failed to be incident upon the core 3a, resulting in an increase in coupling loss between the lensed-fiber 2 and the laser diode 5.

It can be supposed, therefore, that the efficiency of coupling between the lensed-fiber 1 (sic) and the laser diode 5 can be improved by reversing the relation between the incidence angle $\phi_1$ and the incidence position $h_1$ for the light beams emitted from the laser diode 5.

In general, a lens has a function to change the incidence angle and incidence position of light beams. It is reasonable, therefore, to interpose a lens between the optical fiber 3 and the coreless fiber 4. However, the lens is greater in size than the optical fiber 3 and the coreless fiber 4, and it is troublesome to couple the lens with the optical fiber 3 and the coreless fiber 4 so that their respective optical axes are in alignment.

Accordingly, the inventors hereof hit upon use of an optical fiber which has a square-law index profile and came up with the present invention, based on the assumption that the relation between the incidence angle and incidence position can be reversed without using a lens.

In order to achieve the above object, according to the present invention, a lensed-fiber is constructed so that one end of a single-mode fiber, which includes a core and a cladding, and the other end of a coreless fiber, which has a coreless isotropic refractive index and one end thereof worked into a convex surface, are connected by means of a square-law index fiber having a square-law index profile.

Preferably, the square-law index fiber has a length equal to the quarter pitch of a light beam sinusoidally propagating in the fiber or a length equal to an odd multiple thereof.

Preferably, moreover, the convex surface of the coreless fiber is a spherical surface.

Further preferably, the single-mode fiber is a TEC (thermal expanded-core) fiber with the core diameter extended at the one end.

The square-law index fiber having the square-law index profile displays a parabolic refractive index distribution based on a quadratic function with respect to the radial direction of the core. If the length of the square-law index fiber is then equal to the quarter pitch of the sinusoidally propagating light or the length equal to the odd multiple thereof, the relation between incidence angle and incidence position is reversed.

If the convex surface at the one end of the coreless fiber is a spherical surface, it can be worked by using a microtorch or arc discharge, so that the work is easy.

If the single-mode fiber is a TEC fiber with its core diameter extended at one end, moreover, the range of incidence of the light beams projected through the square-law index fiber is wider than that of a fiber whose core diameter is not extended, even in case the refractive index of the coreless fiber is subject to fluctuation.

DETAILED DESCRIPTION

Figure 1:
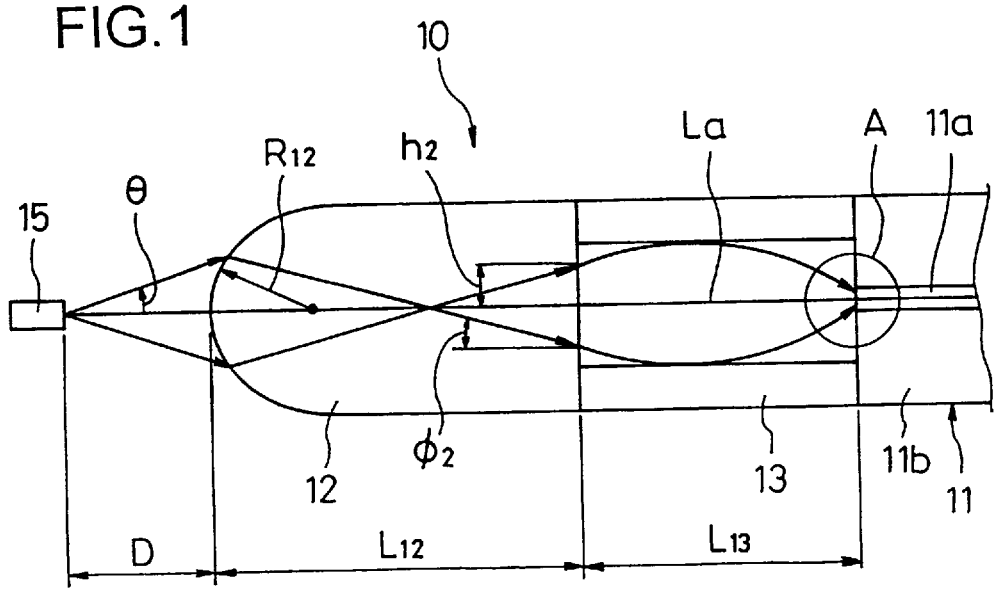
FIG. 1 is a side view showing a lensed-fiber according to the present invention.
Figure 2:
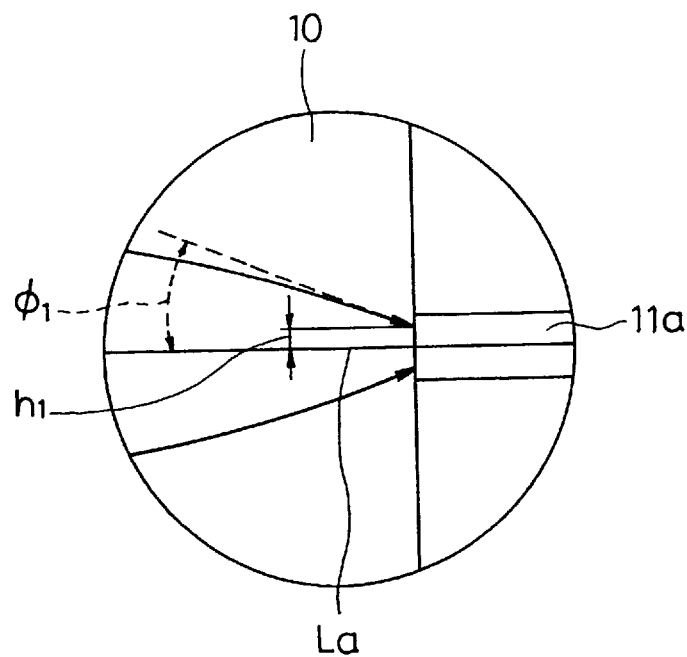
FIG. 2 is an enlarged view of a section A of the lensed-fiber of FIG. 1.

Referring now to FIGS. 1 to 6, one embodiment of the present invention will be described. As shown in FIG. 1, a lensed-fiber 10 includes a single-mode fiber (hereinafter referred to as "SMF") 11 and a coreless fiber 12, which are connected by means of a square-law index fiber 13, and is opposed to an optical semiconductor device, e.g., laser diode 15, at a working distance D therefrom when it is used.

The SMF 11 is an optical fiber which includes a core 11a and a cladding 11b, one end of the SMF 11 being connected to the other end of the coreless fiber 12 by means of the square-law index fiber 13.

The coreless fiber 12 is a fiber with a length $L_{12}$ which has a coreless isotropic refractive index and one end thereof worked into a spherical surface with a curvature radius $R_{12}$.

The square-law index fiber 13 is a graded-index optical fiber which has a length $L_{13}$ equal to the quarter pitch of the sinusoidally propagating light or a length equal to an odd multiple of the length $L_{13}$ and a square-law index profile.

The following is a description of the principle on which the relation between incidence angle and incidence position is reversed in the case where the length of the square-law index fiber 13, in the lensed-fiber 10 according to the present invention, is adjusted to the length equal to the quarter pitch of the sinusoidally propagating light or the length equal to the odd multiple thereof.

In general, the distribution of the refractive index n of the square-law index fiber 13 is given by $$n = n_0[1 - r^2/(2A_g^2)], \quad (1)$$

where $A_g$ is the convergence parameter of light beams in the square-law index fiber 13, r is the distance from the central axis of the square-law index fiber 13, and $n_0$ is the refractive index on the central axis.

Supposing near-axis light beams and using a light matrix, the incidence position $h_1$ and the incidence angle $\phi_1$ (see FIG. 2) on a junction surface between the SMF 11 and the square-law index fiber 13, obtained when light beams emitted from the laser diode 15 are propagated through the square-law index fiber 13 of the length $L_{13}$ to be incident upon the SMF 11, can be expressed as follows:

$$\begin{pmatrix} h_1 \\ \phi_1 \end{pmatrix} = \begin{pmatrix} \cos\gamma & A_g \cdot \sin\gamma \\ -1/A_g \cdot \sin\gamma & \cos\gamma \end{pmatrix} \begin{pmatrix} h_2 \\ \phi_2 \end{pmatrix} \quad (2)$$

where $h_2$ ($\mu$m) is the incidence position of the light beams measured from an optical axis $L_a$ on a junction surface between the coreless fiber 12 and the square-law index fiber 13, $\phi_2$ (degrees) is the incidence angle, and $\gamma$ is equivalent to a phase value indicative of the meandering of the light beams and is given by $\gamma = L_{13}/A_g$.

Since the pitch of the light beams sinusoidally propagating in the square-law index fiber 13 is $2\pi A_g$, on the other hand, a ¼ period is $(\pi A_g)/2$, and the length $L_{od}$ equal. to the odd multiple of the length $L_{13}$, which is equal to the quarter pitch of the propagating light beams, is given by $$L_{od} = \pi A_g (N + \tfrac{1}{2}), \quad (3)$$

where N is a natural number given by $N = 0, 1, 2, \ldots$.

Accordingly, equation (2) may be transformed as follows:

$$\begin{pmatrix} h_1 \\ \phi_1 \end{pmatrix} = \begin{pmatrix} 0 & (-1)^N A_g \\ (-1)^{N+1}/A_g & 0 \end{pmatrix} \begin{pmatrix} h_2 \\ \phi_2 \end{pmatrix} = \begin{pmatrix} (-1)^N A_g \phi_2 \\ (-1)^{N+1} h_2/A_g \end{pmatrix} \quad (4)$$

Thus, it can be seen that when the square-law index fiber 13, which has the length $L_{od}$ equal to the odd multiple of the length $L_{13}$ which is equal to the quarter pitch of the propagating light beams, is connected between the SMF 11 and the coreless fiber 12, the relation between the incidence angle and incidence position of the light beams is reversed with the convergence parameter $A_g$ used as a parameter.

If the specific refractive index difference of the square-law index fiber 13 and the radius of the core are $\Delta$ and a, respectively, the pitch $L_w$ of the sinusoidally propagating light is given by $$L_w = 2\pi A_g = 2\pi a/(2\Delta)^{1/2}. \quad (5)$$

Figure 3:
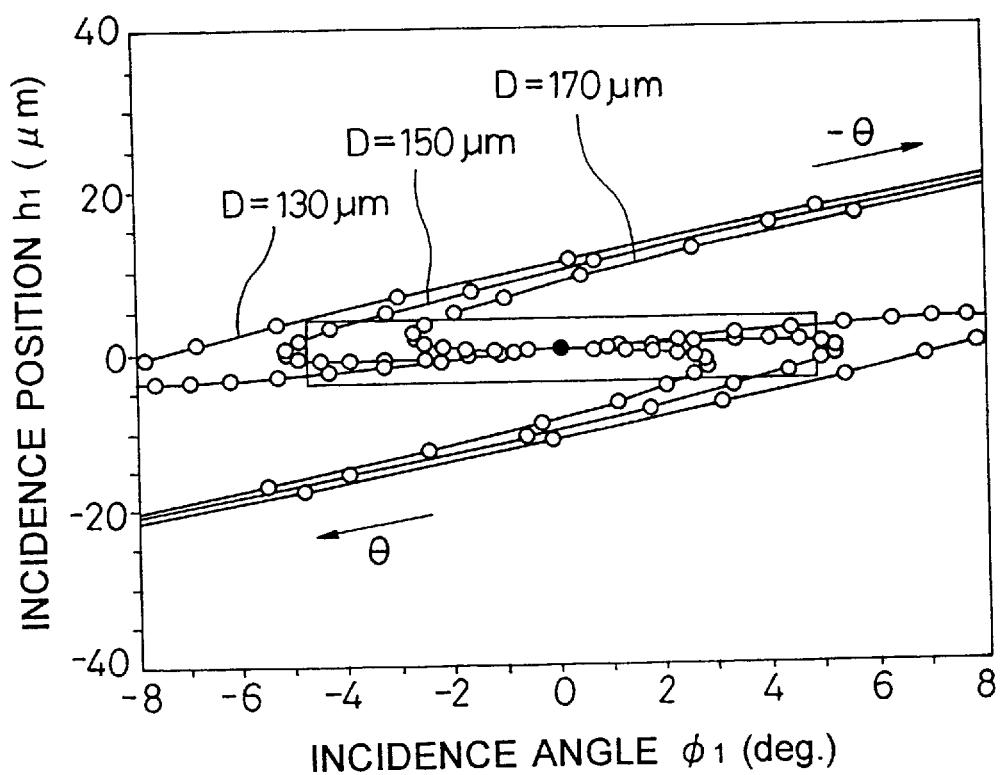
FIG. 3 shows working distance characteristic curves representing the results of analysis of working distance dependence related to the incidence angle $\phi_1$ and incidence position $h_1$ for light beams incident upon a single-mode fiber of the lensed-fiber of FIG. 1.

The relation between the incidence angle $\phi_1$ (degrees) of the light beams on the junction surface between the SMF 11 and the square-law index fiber 13 and the incidence position $h_1$ ($\mu$m) measured from the optical axis $L_a$, in the lensed-fiber 10 according to the present invention arranged in the aforesaid manner, was analyzed by a method based on geometrical optics. FIG. 3 shows the results of this analysis.

In this analysis, the lensed-fiber 10 was arranged so that the refractive index of the coreless fiber 12 was 1.45, working distance D was 130, 150, and 170 ($\mu$m), length $L_{12}$ of the coreless fiber 12 was 1 (mm), curvature radius $R_{12}$ was 75 ($\mu$m), length $L_{13}$ of the square-law index fiber 13 was equal to the quarter pitch of the sinusoidally propagating light (wavelength: 1.3 $\mu$m), and convergence parameter $A_g$ was 250 ($\mu$m). The value of the convergence parameter $A_g$=250 ($\mu$m) corresponds, for example, to the case in which the core radius a and specific refractive index difference $\Delta$ are 25 ($\mu$m) and 0.5%, respectively, in the square-law index fiber 13. In FIG. 3, a black spot represents an analytic value for the incidence angle $\phi_1$ and the incidence position $h_1$ based on the light beams on the optical axis $L_a$ at the emission angle $\theta$=0°.

As for the incidence position $h_1$ and the incidence angle $\phi_1$, as seen from FIG. 3, the incidence position $h_1$ of the light beams had a small value such that it was close to the optical axis $L_a$, while the incidence angle $\phi_1$ was wide, so that the distribution had the shape of a tilted S. In this case, a region represented by an oblong in the drawing indicates ranges for the incidence position $h_1$ and the incidence angle $\phi_1$ in which the light beams emitted from the laser diode 15 can be effectively incident upon the core 11a of the SMF 11. It was indicated that many of light beams emitted from the laser diode 15 at the emission angle $\theta$ were incident upon the SMF 11, and the coupling loss of the lensed-fiber 10 was small.

Subsequently, the lensed-fiber 10 was manufactured in the steps of procedure shown in FIGS. 4A to 4F, in consideration of the results of the analysis described above.

Figure 4A:
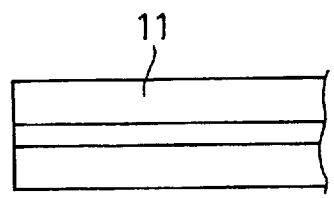
FIGS. 4A to 4F are diagrams for illustrating manufacturing processes for the lensed-fiber of FIG. 1.
Figure 4B:
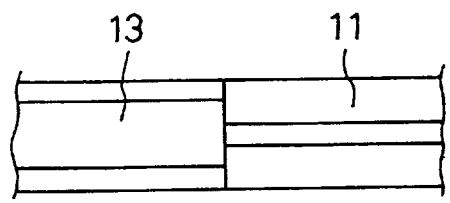
Figure 4C:
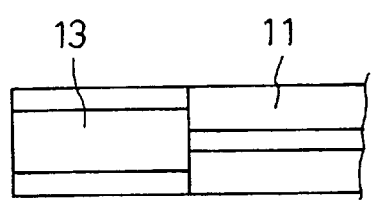
Figure 4D:
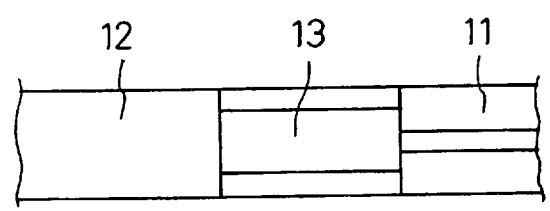

First, the square-law index fiber 13 having the square-law index profile was fused to the tip end of the SMF 11 shown in FIG. 4A (FIG. 4B), and the square-law index fiber 13 was cut to the length $L_{13}$ which is equal to the quarter pitch of the sinusoidally propagating light (FIG. 4C).

Figure 4E:
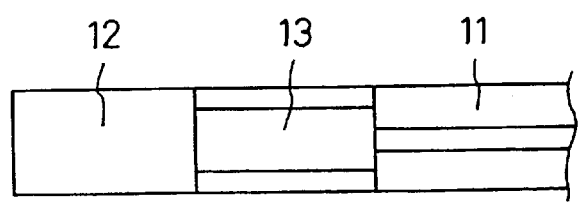

Then, the coreless fiber 12 having the coreless isotropic refractive index was fused to an end portion of the cut square-law index fiber 13 (FIG. 4D), and the coreless fiber 12 was cut to the length $L_{12}$ of about 1 mm (FIG. 4E).

Figure 4F:
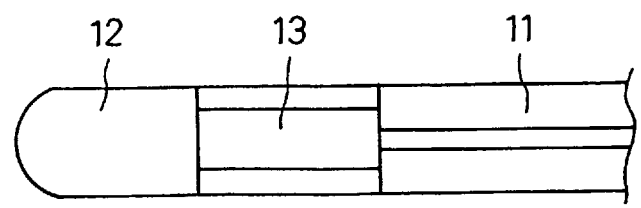

Subsequently, the cut end of the coreless fiber 12 was heated and fused by arc discharge, and was worked into a hemispherical surface with the curvature radius $R_{12}$=75 ($\mu$m), whereupon the lensed-fiber 10 shown in FIG. 4F was manufactured.

Figure 5:
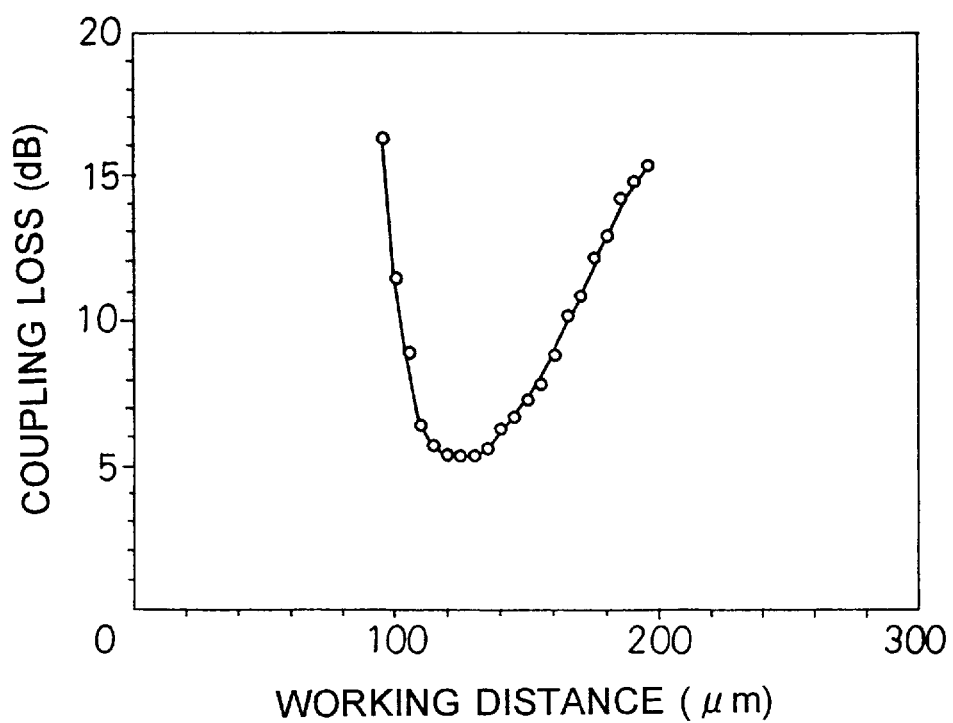
FIG. 5 shows a variation characteristic curve representing the change of coupling loss compared with the change of working distance actually measured on the manufactured lensed-fiber.

A light beam with a wavelength of 1.3 $\mu$m from the laser diode 15 was projected on the manufactured lensed-fiber 10, and the working distance D was varied as the coupling loss was measured, whereupon the results shown in FIG. 5 were obtained. The coupling loss was obtained by measuring the quantity of light emitted from the SMF 11 compared with the quantity of light emitted directly from the laser diode 15.

As seen from FIG. 5, the coupling loss had a minimum value (=5 dB) when the working distance D was about 130 $\mu$m. This coupling loss value was small enough not to arouse any problem in practical use of the lensed-fiber 10, and was a satisfactory value for the elimination of the possibility of interference with the laser diode 15.

Figure 6:
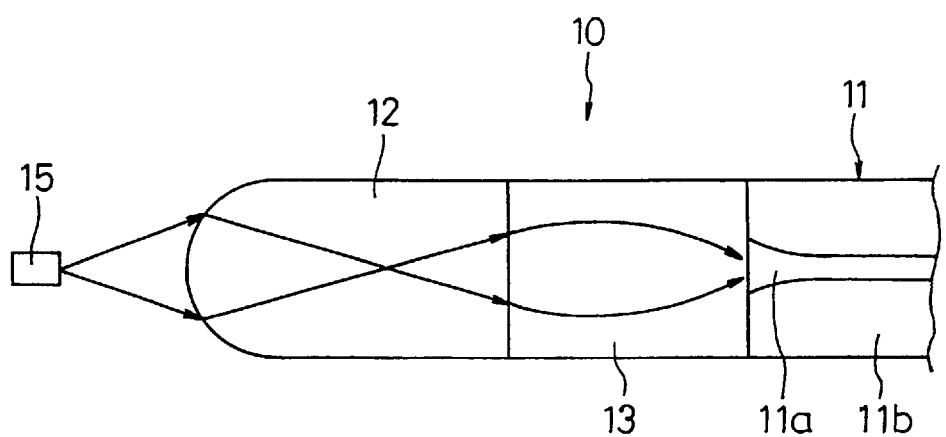
FIG. 6 is a side view showing a modification of the lensed-fiber of the present invention.
Figure 7:
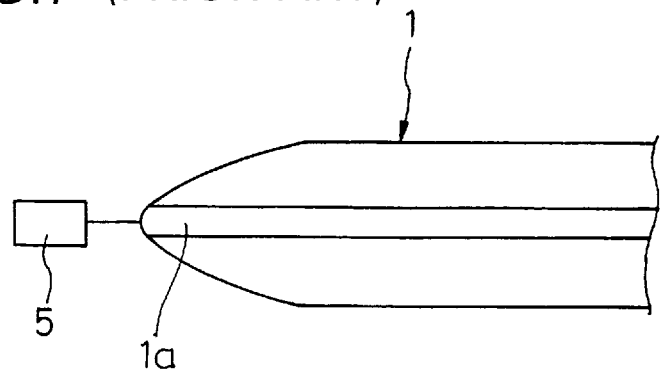
FIG. 7 is a side view of a conventional hemispherically-ended fiber used for coupling with an optical semiconductor device.
Figure 8:
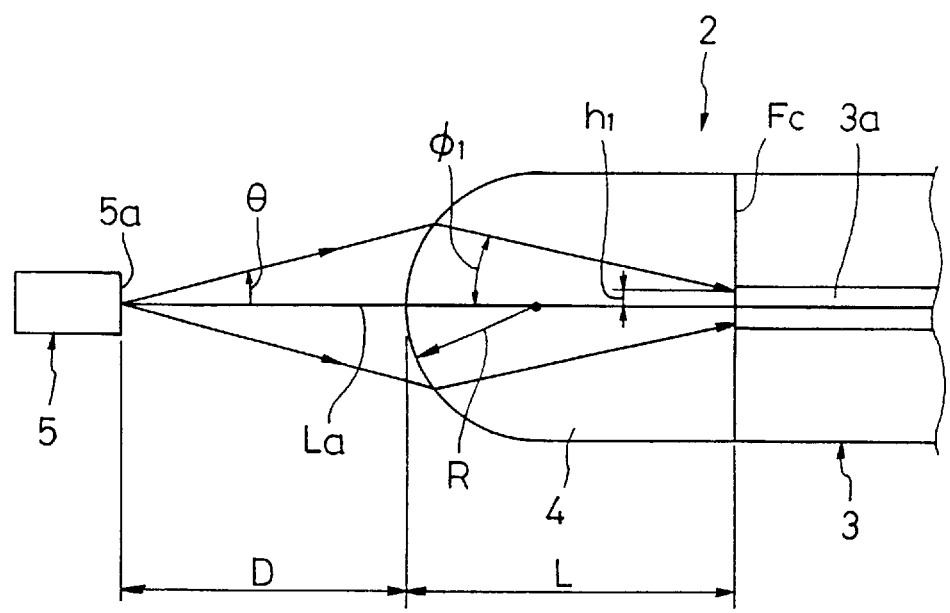
FIG. 8 is a side view of a conventional lensed-fiber used for coupling with an optical semiconductor device.
Figure 9:
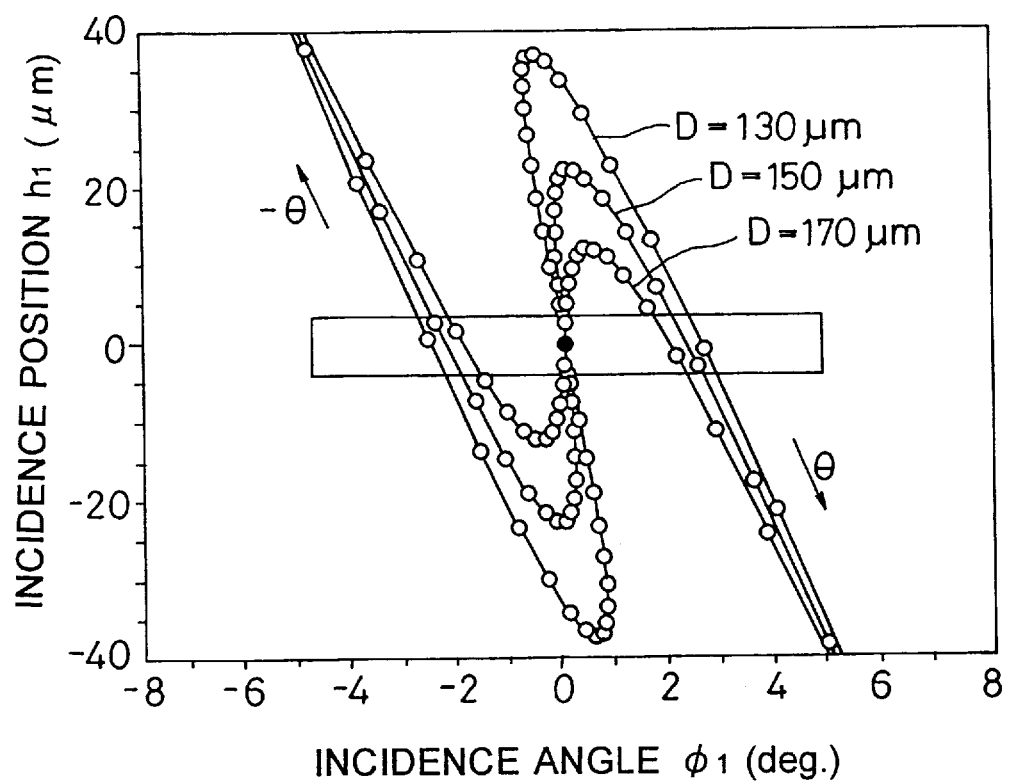
FIG. 9 shows condensing characteristic curves representing effective condensing ranges related to the incidence angle $\phi_1$ and incidence position $h_1$ for light beams incident upon a single-mode fiber of the lensed-fiber of FIG. 8.

The lensed-fiber may be formed of a so-called TEC (thermal expanded-core) fiber in which the core 11a of the SMF 11 is worked so as to spread outward at its end portion on the side of the square-law index fiber 13, as shown in FIG. 6. With use of the fiber worked in this manner, the range of incidence of the light beams projected on the SMF 11 through the square-law index fiber can be extended.

INDUSTRIAL APPLICABILITY

According to the present invention, as is evident from the above description, there may be provided a lensed-fiber which ensures the improvement of the efficiency of coupling between component members. Since all its components are fiber-shaped, the lensed-fiber of the present invention is small-sized and light in weight as a whole. Since all the components are fiber-shaped, moreover, the lensed-fiber of the present invention can be manufactured by utilizing the existing fiber fusion connecting technique, thus providing outstanding effects including ease of manufacture, capability of mass production, low price offered, etc.

If the length of the square-law index fiber is then equal to the quarter pitch of the sinusoidally propagating light or the length equal to the odd multiple thereof, the relation between incidence angle and incidence position is reversed.

If the convex surface at the one end of the coreless fiber is a spherical surface, it can be easily worked by using a micro-torch or arc discharge.

If the single-mode fiber is formed of the TEC fiber with its core diameter extended at one end, moreover, the range of incidence of the light beams projected through the square-law index fiber can be made wider than that of a fiber whose core diameter is not extended.

We claim:

1. A lensed-fiber comprising:

a single-mode fiber including a core and a cladding;

a coreless fiber having a coreless isotropic refractive index and a convex surface at a first end thereof; and a square-law index fiber having a square-law index profile, said square-law index fiber being positioned between said single-mode fiber and said coreless fiber so as to connect an end of said single-mode fiber to a second end of said coreless fiber;

wherein the following relationship is satisfied when a light beam to be propagated through said single-mode fiber is emitted onto said lensed-fiber:

$$\begin{bmatrix} h_1 \\ \phi_1 \end{bmatrix} = \begin{bmatrix} 0 & (-1)^N A_g \\ (-1)^{N+1}/A_g & 0 \end{bmatrix} \begin{bmatrix} h_2 \\ \phi_2 \end{bmatrix} = \begin{bmatrix} (-1)^N A_g \phi_2 \\ (-1)^{N+1} h_2/A_g \end{bmatrix}$$

where $\phi_1$ is an incidence angle of said light beam on a connecting surface between said single-mode fiber and said square-law index fiber, $h_1$ is an incidence position of said light beam measured from an optical axis on said connecting surface between said single-mode fiber and said square-law index fiber, $\phi_2$ is an incidence angle of said light beam on a connecting surface between said coreless fiber and said square-law index fiber, $h_2$ is an incidence position of said light beam measured from an optical axis on said connecting surface between said coreless fiber and said square-law index fiber, N is a natural number, and $A_g$ is a convergence parameter of said square-law index fiber expressed by $A_g=a/(2\Delta)^{1/2}$, where a is a core diameter of said square-law index fiber, and $\Delta$ is a specific refractive index difference of said square-law index fiber.

2. The lensed-fiber according to claim 1, wherein said convex surface of said coreless fiber comprises a spherical surface.

3. The lensed-fiber according to claim 1, wherein said single-mode fiber comprises a thermal expanded-core fiber having a core diameter which is extended at the end of said single-mode fiber connected to the second end of said coreless fiber by means of said square-law index fiber.

4. An optical module comprising the lensed-fiber of claim 1 and an optical semiconductor element arranged in a facing manner at a working distance of at least 130 µm.

5. An optical module comprising the lensed-fiber of claim 1 and an optical semiconductor element, wherein said coreless fiber, said square-law index fiber, said single-mode fiber, and said optical semiconductor element are integrated, and outside diameters of at least said square-law index fiber and said single-mode fiber are substantially equal.

* * * * *